(12) United States Patent
Mechaley et al.

(10) Patent No.: US 8,600,806 B2
(45) Date of Patent: *Dec. 3, 2013

(54) SYSTEM AND METHOD FOR ACTIVATING SOFTWARE OPERATING CAPABILITIES BASED ON USAGE PATTERNS AND RULES

(75) Inventors: Robert Mechaley, Weston, MA (US); Richard A. Miner, Boston, MA (US)

(73) Assignee: Orange SA, Paris (FR)

( * ) Notice: Subject to any disclaimer, the term of this patent is extended or adjusted under 35 U.S.C. 154(b) by 42 days.

This patent is subject to a terminal disclaimer.

(21) Appl. No.: 13/118,219

(22) Filed: May 27, 2011

(65) Prior Publication Data
US 2011/0230175 A1    Sep. 22, 2011

Related U.S. Application Data

(60) Continuation of application No. 11/749,688, filed on May 16, 2007, now Pat. No. 7,962,360, which is a division of application No. 08/804,900, filed on Feb. 24, 1997, now abandoned.

(51) Int. Cl.
*G06Q 10/00* (2012.01)

(52) U.S. Cl.
USPC ............................................... 705/14.25

(58) Field of Classification Search
USPC ............................................... 705/14.25
See application file for complete search history.

(56) References Cited

U.S. PATENT DOCUMENTS

| | | |
|---|---|---|
| 4,740,890 A | 4/1988 | William |
| 4,827,508 A | 5/1989 | Shear |
| 4,996,642 A | 2/1991 | Hey |
| 5,014,234 A | 5/1991 | Edwards, Jr. |

(Continued)

FOREIGN PATENT DOCUMENTS

| | | | | |
|---|---|---|---|---|
| DE | EP0679977 A1 | * | 2/1995 | ............... G06F 1/00 |
| EP | 0811942 A2 | * | 7/1996 | .............. G06F 17/60 |
| EP | 1357728 A2 | | 10/2003 | |
| JP | 408194748 A | * | 7/1996 | .............. G06F 17/60 |

OTHER PUBLICATIONS

Introducing Crash Bandicoot: ready to save the world Business Wire, Sep. 5, 1996.*

(Continued)

*Primary Examiner* — Scott L Jarrett
(74) *Attorney, Agent, or Firm* — Knobbe Martens Olson & Bear LLP

(57) ABSTRACT

A mobile telephone system device having an electronic assistant component is disclosed. The device includes a first software module configured to provide a first operating feature to a user of the mobile telephone system and a second software module that includes a first submodule configured to provide a first additional operating feature to the user and a second submodule configured to provide a second additional operating feature to the user of the mobile telephone system. A third module is configured to track the user's use of the first operating feature by storing usage data related to the user's interaction with the first software module. A fourth module analyzes the stored usage data and determines a usage data pattern. Based on the usage data pattern, a fifth module stores one or more rules which select one of the first submodule and the second submodule based on the usage data pattern and the selected one of the first submodule and the second submodule is offered to the user for installation on the mobile telephone system.

9 Claims, 3 Drawing Sheets

(56) References Cited

U.S. PATENT DOCUMENTS

| | | | |
|---|---|---|---|
| 5,027,388 A | | 6/1991 | Bradshaw et al. |
| 5,103,476 A | | 4/1992 | Waite et al. |
| 5,149,094 A | * | 9/1992 | Tastad ................... 273/121 A |
| 5,233,642 A | | 8/1993 | Renton |
| 5,353,219 A | | 10/1994 | Mueller et al. |
| 5,388,211 A | | 2/1995 | Hornbuckle |
| 5,499,295 A | | 3/1996 | Cooper |
| 5,499,340 A | | 3/1996 | Barritz |
| 5,509,070 A | | 4/1996 | Schull |
| 5,577,244 A | * | 11/1996 | Killebrew et al. ............ 717/169 |
| 5,583,763 A | | 12/1996 | Atcheson et al. |
| 5,586,304 A | * | 12/1996 | Stupek et al. ................. 717/170 |
| 5,590,056 A | | 12/1996 | Barritz |
| 5,668,995 A | * | 9/1997 | Bhat ............................ 718/104 |
| 5,673,315 A | | 9/1997 | Wolf |
| 5,675,510 A | | 10/1997 | Coffey et al. |
| 5,689,560 A | | 11/1997 | Cooper et al. |
| 5,707,059 A | * | 1/1998 | Sullivan et al. ........... 273/121 A |
| 5,708,709 A | | 1/1998 | Rose |
| 5,710,884 A | * | 1/1998 | Dedrick ........................ 709/217 |
| 5,715,390 A | | 2/1998 | Hoffman et al. |
| 5,758,071 A | * | 5/1998 | Burgess et al. ............... 709/220 |
| 5,768,382 A | * | 6/1998 | Schneier et al. .............. 380/251 |
| 5,771,347 A | | 6/1998 | Grantz et al. |
| 5,796,633 A | * | 8/1998 | Burgess et al. ............... 702/187 |
| 5,809,251 A | | 9/1998 | May et al. |
| 5,845,077 A | * | 12/1998 | Fawcett ........................ 709/221 |
| 5,848,396 A | * | 12/1998 | Gerace ........................ 705/7.33 |
| 5,883,954 A | * | 3/1999 | Ronning ......................... 705/52 |
| 5,909,581 A | * | 6/1999 | Park .............................. 717/170 |
| 5,918,004 A | | 6/1999 | Anderson et al. |
| 5,951,633 A | * | 9/1999 | Polcyn ........................... 718/104 |
| 5,960,189 A | * | 9/1999 | Stupek et al. ................. 717/169 |
| 5,971,855 A | * | 10/1999 | Ng .................................. 463/42 |
| 5,999,740 A | * | 12/1999 | Rowley ......................... 717/173 |
| 5,999,808 A | * | 12/1999 | LaDue ....................... 455/412.2 |
| 6,006,034 A | * | 12/1999 | Heath et al. ................... 717/170 |
| 6,009,467 A | * | 12/1999 | Ratcliff et al. ................ 709/224 |
| 6,018,619 A | | 1/2000 | Allard et al. |
| 6,029,065 A | * | 2/2000 | Shah .......................... 455/414.4 |
| 6,029,195 A | | 2/2000 | Herz |
| 6,035,283 A | | 3/2000 | Rofrano |
| 6,047,053 A | | 4/2000 | Miner et al. |
| 6,058,478 A | * | 5/2000 | Davis ............................ 713/191 |
| 6,122,663 A | * | 9/2000 | Lin et al. ...................... 709/224 |
| 6,405,203 B1 | * | 6/2002 | Collart .......................... 382/205 |
| 6,800,027 B2 | * | 10/2004 | Giobbi et al. ................... 463/24 |
| 7,080,371 B1 | * | 7/2006 | Arnaiz et al. ................. 717/170 |
| 7,962,360 B2 | * | 6/2011 | Mechaley et al. ............ 705/7.31 |

OTHER PUBLICATIONS

Vid Game Promos As Entertaining As Games Billboard, vol. 107, No. 34, Aug. 26, 1995.*

Nikhilesh, Dholakia et al., The change business: toward content-based and service-base competition Columbia Journal of World Business, vol. 30, No. 2, Summer 1995.*

Sony Entertainment of America announces exclusive worldwide arrangement for Moral Kombat 3 video game Business Wire, Aug. 18, 1995.*

Roberts, T., Key Quest for VIC-20 Compute's Gazette, vol. 1, No. 6, Dec. 1983.*

Darrow, Barbara; VARS Embrace New App Metering Tools, Computer Reseller News, No. 595, Sep. 12, 1994.

Guzdial, Mark, Deriving Software Usage Patterns from Log Files, Georgia Institute of Technology, Technical Report, 1993.

Marks, Kristin, Pleased to Meter You, Network World, vol. 12, No. 50, Dec. 11, 1995.

Michael, Vizard, Secret Agents of Software, Computerworld, vol. 27, No. 32, Aug. 9, 1993.

Michalski, Jerry, Platforms for Communication, Esther Dyson's Monthly Report, Oct. 19, 1994.

Radding, Alan; Camp Mobilizes Around License Metering Issues, InfoWorld, vol. 16, No. 10, Mar. 7, 1994.

Resnick, Paul et al., Recommender Systems, Communications of the ACM, vol. 40, No. 3, Mar. 1997.

Rosenthal, Beth Ellyn, Software Turns Platform Personnel Into Super Sales People, Banking Software Review, vol. 14, No. 2, Summer 1989.

Wildfire Announces Shipment of Invisible, Weightless Electronic Assistant, Business Wire, Jan. 23, 1995.

Wildfire Communications Granted First of Many Pending Patents on Core Technology, Business Wire, Sep. 15, 1997.

Wildfire Intros Voice Command Electronic Secretary, Newsbytes, Oct. 6, 1994.

Wildfire Now Available to Mass Consumer Market, Business Wire, Feb. 24, 1997.

Wildfire: Wildfire Continues Expansion to Consumer Market with BellSouth Trials, EDGE, May 26, 1997.

\* cited by examiner

SYSTEM AND METHOD FOR ACTIVATING SOFTWARE OPERATING CAPABILITIES BASED ON USAGE PATTERNS AND RULES

CROSS-REFERENCE TO RELATED APPLICATIONS

This application is continuation of U.S. patent application Ser. No. 11/749,688, filed on May 16, 2007 (now U.S. Pat. No. 7,962,360), which is a divisional of U.S. patent application Ser. No. 08/804,900, filed on Feb. 24, 1997. The disclosure of each of the above-referenced patent applications is hereby incorporated by reference in its entirety.

BACKGROUND OF THE INVENTION

1. Field of the Invention

This application is related to a voice responsive telephone assistant device which has an network upgrade capability which offers features to the device based on the type and frequency of use of the voice responsive telephone assistant device.

2. Description of the Related Technology

Today there are many different commercially available devices that enable people to communicate with each other electronically. In addition to the ubiquitous telephone that has been around for decades, there now are cordless phones for the home, mobile phones for the car, handheld wireless phones which fit into a person's jacket pocket, pagers, local and wide area computer networks, and facsimile machines, to name a few. Undoubtedly, the number and type of devices and their sophistication will continue to increase over time. Indeed, it is likely that a day will soon arrive when it will be possible for everybody to conveniently and inexpensively be within arms reach of some communication device that enables them to communicate with other people.

The proliferation of different types of communication devices and the increasing diversity of communications media present new challenges. How will communications among the different devices and over the different communications media be coordinated and managed so that people have truly effective and useful access to each other? One challenge is associated with communicating information between and across different communications media. Another challenge is related to handling the inevitable increase in the number of calls so as to maintain accessibility of users. For example, as more people come to rely on their wireless phones to transact business while on the road or away from their off ices, their phones are likely to be busy a larger percentage of the time. As a consequence, although a wireless phone can go anywhere with its owner, to the people tying to reach that owner when the phone is in use, the owner will still seem to be as inaccessible as when he did not carry a wireless phone. In addition, the more the owner of such a device uses it, the more likely it will be that he will not know that somebody else was trying to reach him and thus he may miss important calls.

Thus, an obvious advantage of many of the new commercially available communications devices is that they offer the possibility of greater mobility to the user. Unfortunately, however, it is not always having to be near the office telephone that ties a business person to the office. The office provides other services that are also important and may not be so mobile. Thus, to fully realize the greater mobility that is offered by the new communications devices and media, these new technologies must be provided in a way that takes into account the business person's dependance on other services besides communications.

In addition to the many various technologies and options which will be available to the user, there will also be costs involved for each of these technologies. A user may not want to pay for all of the technology available to him. At the same time, the vendor of the technology will try to and, in fact will, build into his equipment as many functions and needed technologies as possible. As a result there is a constant tension between the vendor or salesman trying to sell as many services and options as possible and the user who is limited, substantially, in what he may either want, or think he wants, and can afford.

Further, this tension between vendor and user is not limited to electronic communications systems. The complexities of today's systems are encountered in many other fields, from the purchase of an office's computers and the software to run them, to the home television and video tape recorder. The tension also exists in those applications, which are server based, in which hardwired or modem connected desktop computers are serviced by a central server. The central server can provide a number of different functionalities to the user computers (often designated network computers when connected, for example, over a cable connection). Other technologies will be apparent to those working in other fields.

SUMMARY OF THE CERTAIN INVENTIVE ASPECTS

The invention, advantageously, provides a method and apparatus which enables a user to obtain those items which he or she needs at times when he or she is either able to handle them or can afford to purchase them. The invention further enables the user to build up his or her familiarity and confidence for using a system in a manner which provides advantageous, but not hurried, growth.

In one aspect, a mobile telephone system device having an electronic assistant component is provided. The device includes a first software module, the first software module configured to provide a first operating feature to a user of the mobile telephone system. The device further includes a second software module, the second software module comprising a first submodule configured to provide a first additional operating feature to the user and a second submodule to provide a second additional operating feature to the user of the mobile telephone system. A third module is provided which is configured to track the user's use of the first operating feature by storing usage data related to the user's interaction with the first software module. A fourth module is configured to analyze the stored usage data and to determine a usage data pattern therefrom. A fifth module stores one or more rules which select one of the first submodule and the second submodule based on the usage data pattern; and a sixth module is configured to offer the selected one of the first submodule and the second submodule to the user for installation on the mobile telephone system.

Another aspect provides for a computer implemented and user interactive method of regulating provision of software components from a set of software components arranged to control operation of a voice responsive telephone assistant. The set of software components is predefined and each software component in the set provides a distinct functionality. The method includes providing a computer system with a subset of software components from the set of software components and collecting usage data describing user interaction with the subset of software components. The usage data is analyzed to identify a usage data pattern, and a software component is identified from the predefined set based on said identified usage data pattern. The user is then alerted to an availability of said identified software component, wherein said identified component is not within the subset of software components.

In other aspects, the collecting step features such steps as collecting interval of use data for the product and/or statistical data regarding use of the product. Such statistical data, in the illustrated environment of an electronic assistant, such as that described in U.S. patent application Ser. No. 08/316,635 (now U.S. Pat. No. 5,652,789), filed Sep. 30, 1994, and entitled "A Network Based Knowledgeable Assistant," the contents of which are attached hereto as Exhibit A and are incorporated herein, in their entirety, by reference, include identifying when the user has sufficient mastery of different functions, (for example, when certain telephone numbers are called or received a certain minimum number of times in a week), and/or determining when various functions are used in a meaningful way.

In another aspect of this invention, the method relates to brokering upgraded functionality in a voice responsive telephone personal assistant system for enabling greater functionality for a product function in the system. The method features the steps of collecting use data describing use of the product functions, analyzing the data to determine whether at least one use threshold has been exceeded, and communicating to the user of the personal assistant system an availability of the greater functionality for the system when at least one use threshold has been exceeded.

The invention further relates to a system for brokering upgraded resources for enabling a greater functionality for a product function. The system, implemented preferably in a programmed computer, includes software for effecting the steps of collecting data describing user interaction with the product function, analyzing the data to determine whether at least one data pattern can be identified, and communicating to a user of the product function, when at least one data pattern has been identified, an availability of the greater functionality. Among the operations effected by the computer software operating in the computer system are collecting interval of use data for the product and/or collecting statistical data regarding use of the product.

BRIEF DESCRIPTION OF THE DRAWINGS

Other advantages and features of the invention will become apparent from the following description of a preferred illustrated embodiment, taken together with the drawings in which.

DETAILED DESCRIPTION OF THE CERTAIN INVENTIVE EMBODIMENTS

Figure 1:
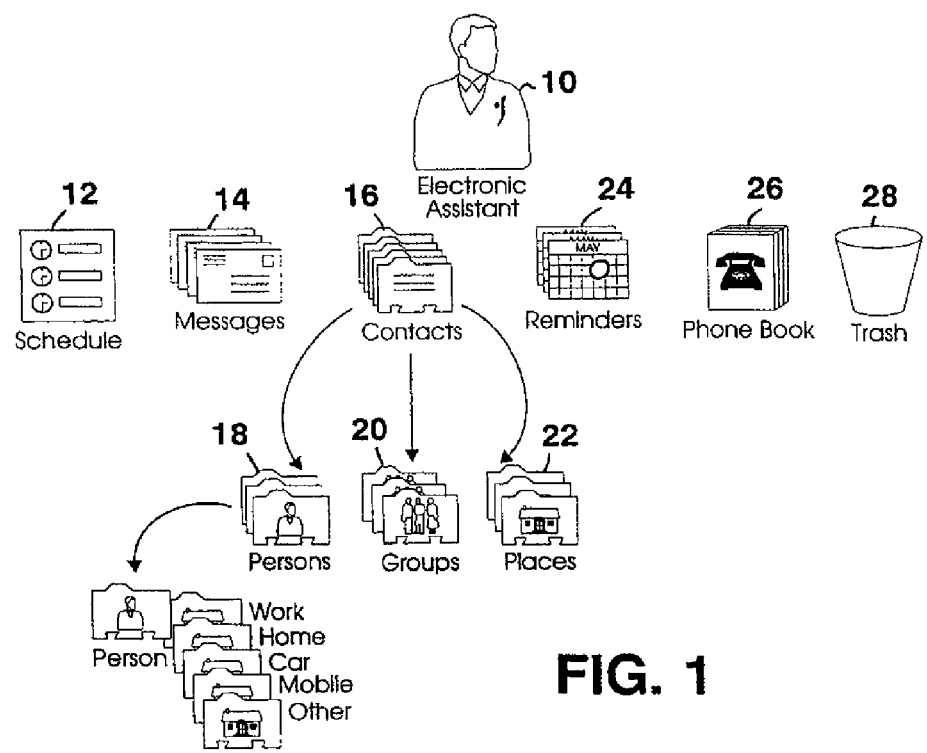
FIG. 1 shows the electronic assistant and office items.

Referring to FIG. 1, the invention is described in the context of an electronic assistant which such as described in U.S. patent application Ser. No. 08/316,635, noted above. The invention, however, is applicable in many other fields and with many other products or product functionalities where a selling up, or upgrading process, can be advantageously employed.

Figure 2:
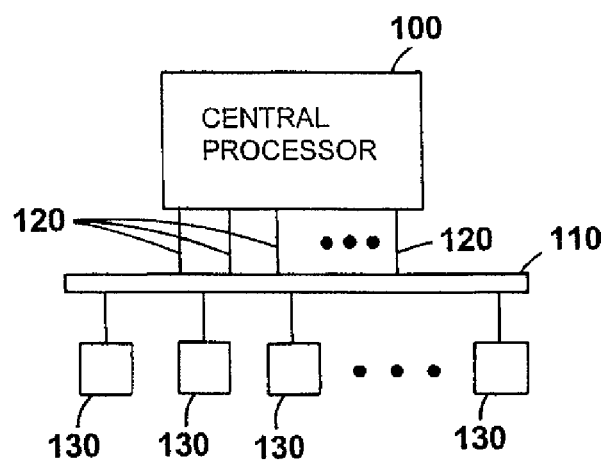
FIG. 2 shows a first hardware configuration.

Thus, referring to FIG. 2, in a most general case, a system according to the invention can have a central processor 100 which connects to a local area network 110 over a plurality of input/output lines 120. Also connected to the local area network 110 are a plurality of user modules 130. This structure can be used for example, where the user modules are telephone connections, where local area network is a telephone network and the lines 120 are connections from the telephone network to the central processor. In the instance of the electronic assistant described in connection with U.S. patent Ser. No. 08/316,635, the central processor provides a number of different functionalities, available to the users through the modules 130. A plurality of user connections can be active at any time as evidenced by the plurality of connecting lines 120.

Figure 3:
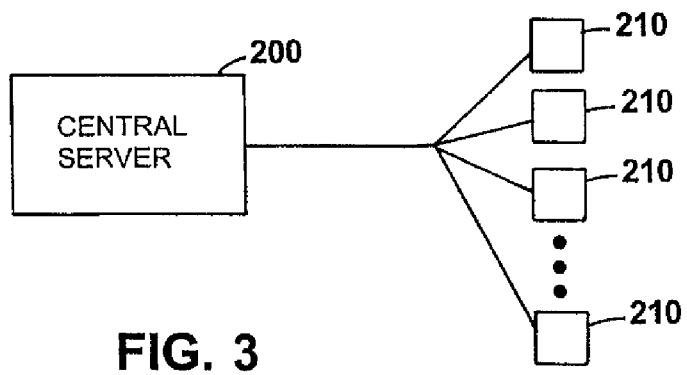
FIG. 3 shows a second configuration for the system architecture.

In a alternate structure, referring to FIG. 3, the central processor acts as a central server 200 which connects over either a network, which can be a telephone network, a cable network, a local area network, etc. to a plurality of so-called thin network computers 210 or the equivalent. In this configuration, the applications are stored at the server and the network computers 210 operate upon the application provided by the server. Other configurations will be apparent to those practiced in this field and the invention is not limited to the particular configurations illustrated in FIGS. 2 and 3.

Referring then to FIG. 1, in the context of an electronic assistant, the equipment introduces many new concepts to the typical user or subscriber, using what can best be described as a "virtual office", as a model. The assistant 10 works in an office containing the subscribers' objects, which are called "items". An item is a piece of information that the electronic assistant stores in a database and works on for the subscriber.

The subscriber can use spoken or touch-tone commands to have the electronic assistant work on various items and the electronic assistant then uses a dialog to gather the information it needs from the subscriber to complete one or more tasks. Since many systems, such as the electronic assistant noted above, can have many features, it is not uncommon for a vendor to price the product according to the functionality which has been purchased. In the electronic assistant identified in U.S. patent application Ser. No. 08/316,635, the various items can include any of the following: a schedule 12, a message 14, a contact 16, (for example, a person 18, a group 20, or a place 22), a reminder 24, a phone book 26, or trash 28. Messages also include other items such a contact, a reminder, or a page, etc. Messages can also be multimedia or include any sort of composite information. From the vendor's prospective, it is desirable to sell to the subscriber as "fully loaded" a product, with as much functionality, as possible. In this manner, the subscriber can have a fully functional product, at a cost, and the vendor is able to obtain the greatest price since the product functionality is the highest. Often, however, the subscriber is neither willing nor able to pay the cost of a fully functional system, or may not want, or believe that he does not want, all of the functionality which the vendor can provide. There thus exists an inherent conflict between the subscriber and the vendor which ultimately can result in either no sale or the sale of a very limited product with little likelihood of further enhancements without substantial sales force involvement. In accordance with one aspect of the invention, however, there is included, in the delivered product, a brokering system which automatically makes available to the user or subscriber, upon specified circumstances and costs, functionality beyond that which he had purchased.

That functionality can in some instances be built into the system as originally delivered, but not yet made available to the user or subscriber until he has purchased it, or it can be, for example, functionality such as a user software and/or hardware upgrade, which includes additional functions beyond those originally purchased by the user or subscriber. The brokering system included in the product originally provided to the user or subscriber, in any circumstance in accordance with the invention, has the ability to automatically monitor various data, such as the use of the product by the user, and thereby make decisions with regard to when to offer to the user the additional functionality, and the type of functionality to be offered.

In accordance with another aspect of the inventive structure, as noted above, the brokering system can be a server based centralized system having full functionality while the network computers connected to it have different or varying functionality. In such a system, the brokering system is included in the centralized server and, depending upon various data which it monitors or seeks, such as the use of the server by the user, it makes decisions with regard to when and how to offer to the user any additional functionality, and the type of functionality to be offered. In this instance, therefore, the monitoring system is not built into the user purchased portion of the system but is available at a central site, server 200, along with, in typical instances, the full functionality which will be offered.

In other aspects of the invention, the central site may not have the full functionality and the operator of the central site may be required to purchase additional functionality once the demand for that functionality becomes apparent. Thus, in the context of the electronic assistant described in U.S. application Ser. No. 08/316,635, a delivered system can contain many features and functions. These include a high level function for call answering and voice messaging between groups, single number or call routing, basic scheduling and reminders, voice dialing phone numbers, voice dialing contacts, group features, unified mailbox, etc. While these features work well as a complete package, many of them can stand alone as individual services, or work as combined sets of features.

There are two drawbacks of grouping the features together. One is complexity for the end user and the other is cost. The invention discloses a method for providing users of a large application with a mechanism to start off with a seemingly much smaller feature set and which, thereafter, can have additional features sold to the user or subscriber (and added to the service) over time. As described in more detail below, the system itself monitors the user's usage and other data and offers or sells the additional services or functionality automatically.

As suggested above, grouping all the features together causes the application to be very large and therefor difficult to learn by the end user. Placing all of the features in the initial product offering results in the user or subscriber having to pay for all of the resource requirements, development and support of the complete application (even though the subscriber may only use a smaller subset). This would be similar to requiring someone, who is just starting out with a new computer, to pay for an entire Office Professional Suite.

If the user could start out with a simple word processor, and if the system could determine that he has learned the features of the processor, and is familiar "enough" with the product, then the system can suggest that he try a full-featured word producer. The system could automatically upgrade (for example, on-line and if desirable, on a trial basis), deliver a quick on-line tutorial and bill them for the new features. Then after a (short) time interval, the system could offer the user a spelling and grammar checking module, then a minimal spread sheet, a scheduler, etc. This can continue until the user has acquired the entire functionality of the Office Professional Suite. The user builds up functionality at his own pace and can decide whether or not to add a database and presentation package to the bundle. That is, depending upon need and price, various upgrades can be purchased.

Thus, users or subscribers start with a set of basic services. As they use those services, the system automatically evaluates individual usage patterns, demographics, and other data, and offers additional services that fit the user's work style. Since subscribers or users acquire new services at their own pace, they feel in control: choosing only the features that they value, and mastering each new set of services before adding new ones.

While described in terms of an electronic assistant, the invention is equally applicable to other product functions and system structures, which can be upgraded in a continuous and rational manner. For purposes of the description which follows, however, the use of the electronic assistant shall be continued, in detail.

The basic functional elements, according to the illustrated electronic assistant embodiment of the invention are: 1. An Entry Level Service (ELS)—In the case of the electronic assistant, this can be a package of functionality such as voice messaging or voice dialing. The user or subscriber starts with the basic functionality in these packages. In the case of voicemail, the user can, for example, retrieve, review and call back people who have left messages. In the case of voice dialing, the user can have the capability to create and dial contacts.

2. Sell up modules—These are modules of new capabilities which can be plugged into the ELS's. For instance, the ability to receive a call while the user is listening to messages, the ability for the user to create voice notes which are stored with his messages, the ability to set reminders, etc. Further, some ELS's themselves might be sell up modules for other ELS's. For instance, voice dialing (which is itself an ELS) might be a sell up module for voicemail.

3. Usage Data—The illustrated system accumulates data from the operation of the system and the user's relative activity, a user's account, or groups of users' or user's accounts. For instance, if a user is using the voicemail ELS (VM-ELS), the system can also keep track of each caller who calls him, the caller's phone number, how the caller says his name, etc. The system might also keep track of the fact that the user calls back some of these callers frequently while others are not called back. Other types of data that might be collected include:—how many times a user has used a particular feature (for example, to determine whether the user has exercised enough system functionality and is ready to learn more);—who calls the user; how often does the system determine a particular person has called (for example, to determine how and when to sell up the contacts and voice dialing functionalities);—what time of day is the account used most often (for example, to enable the system to offer to call the user at that time of day each day);—how often does the user turn on and off their mobile phone (for example, to decide that the subscriber needs a follow-me service).

4. Sell up Rules—Sell up rules are associated with sell up modules and define when the sell up modules are triggered by the Usage Data. For example, there can be a set of rules to define how/when to sell up from the VM-ELS to VM-ELS+ Contact/Voice-dialing SUM (CVD-SUM).

The rule can be, for example: If: (the user has used VM-ELS for at least 2 months) AND ((the user has received frequent calls for at least two months) AND (the user has used the call-phone number command twice per day for at least five days)) Then Sell up CVD-SUM 5. Automated Marketing Manager Module—This is the module which analyzes the rules and makes the decision to suggest the sell up. It can evaluate straight rules; and/or it can use fuzzy logic to help it make decisions. It can tune or adapt itself, (the rules and the "fuzzy-ness") based on history. (This typically requires that the module collect data from many users as described in more detail below.) For instance, there should be a feedback loop identifying if the sell up was successful so that the module can tune or adapt itself based on a longer history of users. The data that is collected from multiple systems should be able to be used and analyzed (for example, in an automated way) so that the module can become "smarter" (that is, trained) over time and can have greater success when it offers a sell up.

Figure 4:
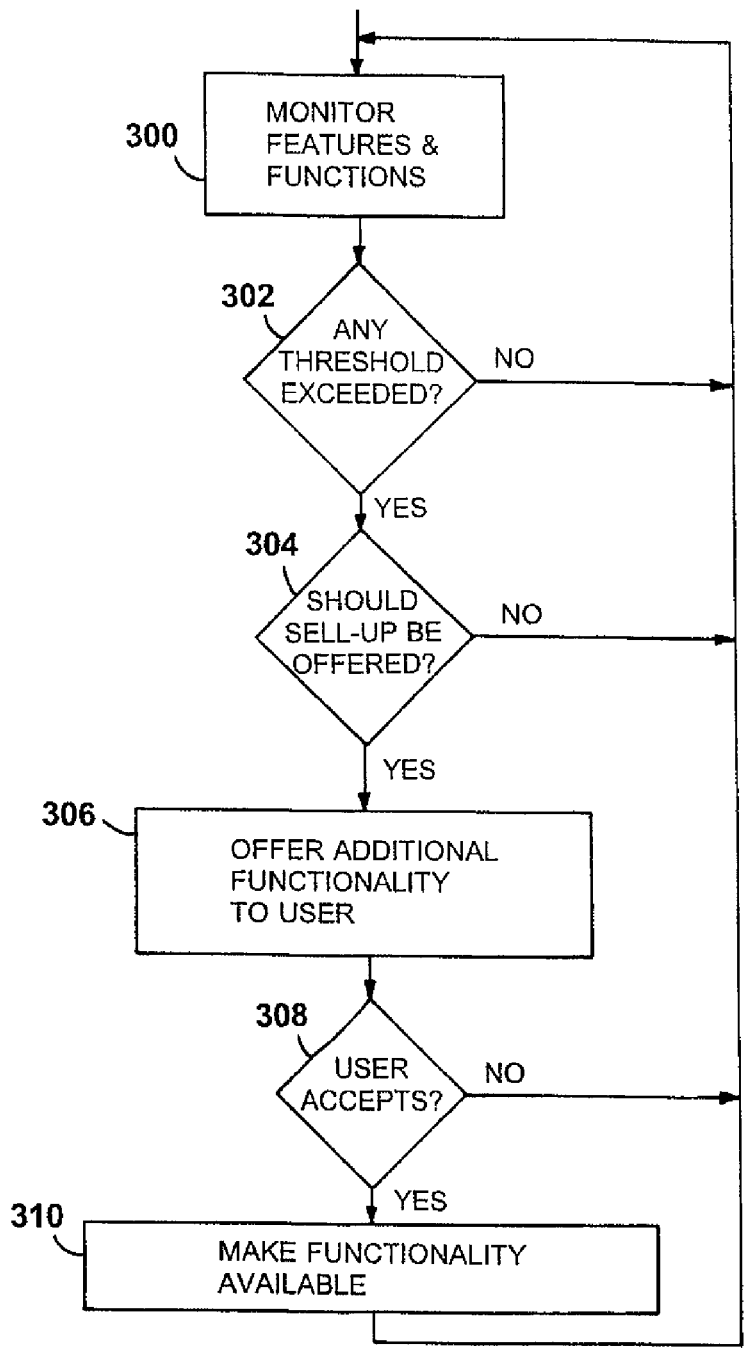
FIG. 4 is a process view of the software architecture.

Referring to FIG. 4, in accordance with the invention, the system at 300 monitors various of the features and functions described above. If it determines any threshold is exceeded, at 302, the system, at 304, determines whether, according to its rules, a sell up should be offered to the user. If no sell up is to be offered, the system returns to its monitoring mode at 300. If a sell up procedure is to be offered, the added functionality is made available to the user, at 306, depending upon the use pattern or data which initiated the sell up. The user accepts or declines the added functionality, at 308; and if accepted, the added functionality is made available to the user on the offered terms at 310. Control then returns to step 300.

As the system, whether it be the configuration of the control processor 100 (FIG. 2) or central server 200 (FIG. 3) monitors the features and functions of the system, it compares its collected data against predetermined, or "fuzzy", thresholds according to the illustrated embodiment of the invention. The data which it monitors can include solely use data as described above, or, it can also include demographic or geographic data and other information provided by the user, to enable the system to make a more intelligent decision regarding sell up. Thus, if the user is located in the Northeastern part of the United States, and it is winter, the system may offer the user access to additional databases, for example, for use in skiing. In another situation, if the system knows that the user is an attorney, and the user has had sufficient use of the system, the system can offer the user access to a lawyer's database and the functionality associated therewith.

Thus, once a threshold has been exceeded, that is, once a data pattern has been identified, (and typically a threshold or data pattern is dependent upon one or more monitored parameters or pieces of information), the system makes the decision whether the sell up should be offered, as indicated at 304. The decision can be made, for example, by rule, that is, if the threshold is exceeded, a sell up should be offered. On the other hand, if the system is adaptive, it can determine whether offering a particular sell up to other users under the same conditions was successful. If the success rate is minimal, then the system can decide that the sell up should not be offered. Thus, the system has the capability of gathering data from a plurality of users and operating upon that data to determine whether the sell up should be offered. The data, in the case of the system illustrated in FIG. 2, may be stored individually at the user locations 130 in which case the system will need to acquire that data; and in the case of, for example, the system of FIG. 3, the data can be stored centrally. In either instance, the brokering process operates upon the data in the same manner.

As noted at step 306, the additional functionality is offered to the user once the decision is made to offer the sell up. In accordance with the illustrated electronic assistant embodiment of the invention, the offer can be made in a number of different ways. In accordance with a preferred embodiment, the sell up is placed in an interactive message, listed among the various messages available to a user, and the message dialog proceeds in an interactive manner. Thus, the system can make an offer, can inquire of the user as to various aspects of the offer, including differing amounts of functionality, differing prices, and differing interests on the part of the user; and thereafter, if accepted, the system can provide the additional functionality as will be described in more detail below.

In other embodiments of the electronic assistant, the availability of the additional functionality may be made in other ways, for example, during the ordinary dialog between the electronic assistant and the user. In those systems wherein there is no voice interactive capability, the offer can be made on the user's display screen. Most often, in this circumstance, the system will open a dialog box, preferably an interactive dialog box requiring either user key strokes or mouse clicks in response to questions posed by the system. In either circumstance, the user has the option of cancelling the sell up offer at any stage of the interactive dialog or accepting the additional functionality.

It should be noted, that this system thus has various methods for communicating the availability of the additional functionality to the user, by interactive voice communications, by communications using the user's display, and presumably even by communicating through a written mode such as the printer.

Finally, the functionality is made available to the user, if the user decides to accept the offer, on the terms stated by the system, either by simply enabling that functionality should it already exist within the system (for example for other users, within the server 200, or previously packaged and available at user modules 130). Alternatively, the system may require a modem connection to a central server for downloading the additional functionality to the local site, or it may require the actual purchase and physical delivery of upgraded materials, such as software, from a central vendor location.

Additions, subtractions, and other modifications of the invention will be apparent to those practiced in the field, and are within the scope of the following claims.

What is claimed is:

1. A computer implemented and user interactive method of regulating provision of software components from a set of software components arranged to control operation of a computing device, wherein composition of the set is predefined and each software component thereof provides a distinct functionality, the method comprising:

storing, a subset of software components from the set of software components, wherein the subset of software components has a first functionality level associated therewith;

controlling the operation of the computing device using the stored subset of software components;

collecting usage data describing user interaction with the stored subset of software components;

generating usage data indicative of a usage data pattern, wherein the usage data pattern is indicative that a user threshold has been exceeded, wherein the user threshold is based on the amount of usage of a feature of the first subset of software components;

identifying a different software component from the predefined set based on said generated usage data pattern and predetermined rules specifying a relationship between usage of one of software components in the stored subset and the identified software component, wherein the identified software component has a second functionality level higher than the first functionality level and wherein the identified software component provides operating capabilities additional to those provided by the subset of software components;

alerting the user to an availability of said identified software component for activation on the computer, wherein said identified software component is not within the subset of software components; and receiving and activating said identified software component onto the computing device, responsive to the user's interactions with the alert.

2. The method of claim 1, further comprising:

collecting usage data from a plurality of users, collecting software usage decisions from a plurality of users, and determining when to alert a user of the availability of said identified software component based upon an analysis of group response data and decisions about to prior alerts relating to the identified software component.

3. The method of claim 1, wherein alerting the user to an availability of said identified software component for activation on the computing device comprises verbally and interactively making an offer to said user for said identified software component in using said computing device.

4. The method of claim 1, wherein alerting the user to an availability of said identified software component for activation on the computing device comprises displaying a new message identifying the identified software component to a user.

5. The method of claim 1, wherein the collecting comprises collecting interval of use data for said subset of software components.

6. The method of claim 1, wherein the collecting comprises compiling statistical data regarding use of said subset of software components.

7. A system for regulating provision of software components from a set of software components arranged to control operation of a mobile telephone device, wherein composition of the set of software components is predefined and each software component in the set of software components provides a distinct functionality, the system comprising:

a control module configured to control the operation of the mobile device by executing a subset of software components from said set of software components, wherein the subset of software components has a first functionality level associated therewith;

a data collection module configured to collect usage data indicative of user interaction with the first subset of software components to identify a usage data pattern related to the collected usage data, wherein the usage data pattern is indicative that a user threshold has been exceeded, wherein the user threshold is based on the amount of usage of a feature of the first subset of software components;

wherein the control module is further configured to access predetermined rules specifying a relationship between usage of a first software component and selection of a second, different, software component, the second software component having operating capabilities additional to those provided by the first software component, and both said components being within said predefined set of software components;

wherein the system is configured to identify a software component from the set based on said identified usage data pattern and said predetermined rules and is further configured to alert the user to an availability of said identified software component, wherein said identified component has a second functionality level higher than said first functionality level, and wherein said identified component is not within the subset of software components, and wherein the system is further configured to receive and activate said identified software component onto the computing device , responsive to the user's interactions with the alert.

8. The system of claim 7, wherein the control module is further configured to receive usage data relating to interactive communications with the mobile telephone device, thereby collecting said usage data.

9. The system of claim 7, wherein the mobile device is a voice responsive system having a mobile telephone network capability.

* * * * *

UNITED STATES PATENT AND TRADEMARK OFFICE
CERTIFICATE OF CORRECTION

| | | |
|---|---|---|
| PATENT NO. | : 8,600,806 B2 | Page 1 of 1 |
| APPLICATION NO. | : 13/118219 | |
| DATED | : December 3, 2013 | |
| INVENTOR(S) | : Mechaley, Jr. et al. | |

It is certified that error appears in the above-identified patent and that said Letters Patent is hereby corrected as shown below:

Title Page, Item (12), Change "Mechaley" to --Mechaley, Jr. et al.--.

Title Page, (Item 75, Inventors) at line 1, Change "Robert Mechaley" to --Robert Mechaley Jr.--.

In the Specification:

In column 1 at line 53, Change "tying" to --trying--.

In column 2 at line 2, Change "dependance" to --dependence--.

In the Claims:

In column 10 at line 30, In Claim 7, change "device ," to --device,--.

Signed and Sealed this
Seventeenth Day of June, 2014

Michelle K. Lee
*Deputy Director of the United States Patent and Trademark Office*